(12) United States Patent
Mildh et al.

(10) Patent No.: US 11,284,468 B2
(45) Date of Patent: Mar. 22, 2022

(54) SUSPENDING/RESUMING MEASUREMENTS IN RRC INACTIVE STATE

(71) Applicant: Telefonaktiebolaget LM Ericsson (publ), Stockholm (SE)

(72) Inventors: Gunnar Mildh, Sollentuna (SE); Icaro L. J. da Silva, Solna (SE); Henning Wiemann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/461,294

(22) PCT Filed: Mar. 26, 2019

(86) PCT No.: PCT/SE2019/050272
§ 371 (c)(1),
(2) Date: May 15, 2019

(87) PCT Pub. No.: WO2019/190383
PCT Pub. Date: Oct. 3, 2019

(65) Prior Publication Data
US 2020/0120742 A1    Apr. 16, 2020

Related U.S. Application Data

(60) Provisional application No. 62/648,148, filed on Mar. 26, 2018.

(51) Int. Cl.
*H04W 76/27* (2018.01)
*H04W 76/30* (2018.01)
(Continued)

(52) U.S. Cl.
CPC ........... *H04W 76/27* (2018.02); *H04W 24/10* (2013.01); *H04W 36/08* (2013.01); *H04W 76/30* (2018.02)

(58) Field of Classification Search
CPC ..... H04W 24/10; H04W 36/08; H04W 76/27; H04W 76/30; H04W 24/04
See application file for complete search history.

(56) References Cited

U.S. PATENT DOCUMENTS

2013/0039287 A1*  2/2013  Rayavarapu .......... H04W 76/28
                                                       370/329
2018/0092156 A1*  3/2018  Kim ................... H04W 72/0406
(Continued)

FOREIGN PATENT DOCUMENTS

WO    2018031603 A1    2/2018

OTHER PUBLICATIONS

Shih et al. "Methods and Systems for Secondary Node Blind Addition", Jul. 2017, FG Innovation IP Company Limited, U.S. Appl. No. 62/537,702, Total pp. 19 (Year: 2017).*
(Continued)

*Primary Examiner* — Shah M Rahman
(74) *Attorney, Agent, or Firm* — Murphy, Bilak & Homiller, PLLC

(57) ABSTRACT

According to an aspect, a wireless device enters an RRC inactive state from a RRC connected state, in response to a message received from the wireless network. The wireless device subsequently transitions from the RRC inactive state to the RRC connected state and resumes one or more measurements according to one or more measurement configurations stored while the wireless device was in the RRC inactive state.

16 Claims, 12 Drawing Sheets

(51) Int. Cl.
*H04W 24/10* (2009.01)
*H04W 36/08* (2009.01)

(56) References Cited

U.S. PATENT DOCUMENTS

| | | | | |
|---|---|---|---|---|
| 2018/0110082 | A1* | 4/2018 | Saily | H04W 74/0833 |
| 2018/0192426 | A1* | 7/2018 | Ryoo | H04W 72/085 |
| 2018/0270682 | A1* | 9/2018 | Zacharias | H04W 76/10 |
| 2019/0014492 | A1* | 1/2019 | Kim | H04L 5/001 |
| 2019/0037625 | A1* | 1/2019 | Shih | H04W 48/16 |
| 2019/0037632 | A1* | 1/2019 | Uchino | H04W 76/19 |
| 2019/0037635 | A1* | 1/2019 | Guo | H04W 76/27 |
| 2019/0132066 | A1* | 5/2019 | Park | H04W 36/0079 |
| 2019/0150014 | A1* | 5/2019 | Virtej | H04W 24/10 |
| | | | | 370/329 |
| 2019/0150221 | A1* | 5/2019 | Tseng | H04W 36/0055 |
| | | | | 370/331 |
| 2019/0174571 | A1* | 6/2019 | Deenoo | H04W 76/11 |
| 2019/0215800 | A1* | 7/2019 | Fujishiro | H04W 76/27 |
| 2019/0215887 | A1* | 7/2019 | Burbidge | H04W 48/14 |
| 2019/0261195 | A1* | 8/2019 | Cheng | H04W 24/10 |
| 2019/0274076 | A1* | 9/2019 | Kim | H04W 36/0058 |
| 2019/0357109 | A1* | 11/2019 | Hong | H04W 76/19 |
| 2020/0022083 | A1* | 1/2020 | Jin | H04W 52/0235 |
| 2020/0029262 | A1* | 1/2020 | Kim | H04W 36/0061 |
| 2020/0128422 | A1* | 4/2020 | Kim | H04W 68/02 |
| 2020/0221525 | A1* | 7/2020 | Yang | H04W 24/08 |

OTHER PUBLICATIONS

Virtej et al. "Early Measurement Reporting for Cell Access", Nov. 2017, Nokia Technologies, U.S. Appl. No. 62/587,141, Total pp. 19 (Year: 2017).*

CATT, "R2-164805 Characteristics of Inactive State", Aug. 2016, 3GPP TSG RAN WG2 Meeting #95, Gothenburg, Sweden, Aug. 22-26, 2016, Total pp. 9 (Year: 2016).*

OPPO, "R2-1801805 Mobility state estimation issue during RRC state transition", Aug. 2016, 3GPP TSG-RAN 2#101, Athens, Greece , Feb. 26 Mar. 2, 2018, Total pp. 4 (Year: 2018).*

Unknown, Author, "Considerations on fast access inter-site small cells in NR", 3GPP TSG-RAN WG2 Meeting #96, R2-167545, Reno, USA, Nov. 14-18, 2016, pp. 1-8.

Unknown, Author, "Fast SCell Configuration through Quick SCell Measurement Reporting", 3GPP TSG-RAN2 Meeting #101, R2-1802073, Athens, Greece, Feb. 26-Mar. 2, 2018, pp. 1-8.

Unknown, Author, "Measurement configurations and signaling for fast setup", 3GPP TSG-RAN WG2 #101, R2-1802645, Athens, Greece, Feb. 26-Mar. 2, 2018, pp. 1-3.

Unknown, Author, "Solution: Mobility Framework", SA WG2 Meeting #S2-113ah, S2-161323, Sophia Antipolis, FR, Feb. 23-26, 2016, pp. 1-5.

3GPP, "3rd Generation Partnership Project; Technical Specification Group Radio Access Network; Evolved Universal Terrestrial Radio Access (E-UTRA); Radio Resource Control (RRC); Protocol specification (Release 15)", TS 36.331 V15.0.0, Dec. 2017, pp. 1-776.

Unknown, Author , "BWP Impacts on Idle/Inactive Mode", 3GPP TSG-RAN Wg2 NR Ad hoc 0118, R2-1800129, Vancouver, Canada, Jan. 22-Jan. 26, 2018, 1-3.

Unknown, Author , "Message 3 design of U-plane solution for non-NB-IoT UEs", 3GPP TSG-RAN WG2 #93bis, R2-162274, Dubrovnik, Croatia, Apr. 11-15, 2016, 1-9.

Unknown, Author , "The content of AS context for inactive UE", 3GPP TSG-RAN WG2#101, R2-1803268, Athens, Greece, Feb. 26-Mar. 2, 2018, 1-3.

* cited by examiner

```
                        500
                         ↘

┌─────────────────────────────────────────────────┐
│  ENTER AN RRC INACTIVE STATE FROM AN RRC CONNECTED │
│  STATE, IN RESPONSE TO A MESSAGE RECEIVED FROM THE │
│                 WIRELESS NETWORK                  │
│                       502                         │
└─────────────────────────────────────────────────┘
                         │
                         ▼
┌─ ─ ─ ─ ─ ─ ─ ─ ─ ─ ─ ─ ─ ─ ─ ─ ─ ─ ─ ─ ─ ─ ─ ─ ─┐
│      PERFORM ONE OR MORE OF THE FOLLOWING STEPS:  │
│                                                   │
│   RESPONSIVE TO OR IN CONJUNCTION WITH ENTERING THE│
│  RRC INACTIVE STATE, PERFORM A SET OF ACTIONS RELATED│
│   TO HANDLING OF PREVIOUSLY RECEIVED MEASUREMENT  │
│                   CONFIGURATIONS;                 │
│                                                   │
│   RESPONSIVE TO OR IN CONJUNCTION WITH ENTERING THE│
│   RRC INACTIVE STATE, SUSPEND ONE OR MORE PREVIOUSLY│
│            CONFIGURED MEASUREMENTS; AND           │
│                                                   │
│     WHILE IN THE RRC INACTIVE STATE, PERFORM A SET OF│
│     ACTIONS RELATED TO THE HANDLING OF PREVIOUSLY │
│         RECEIVED MEASUREMENT CONFIGURATIONS       │
│                       504                         │
└─ ─ ─ ─ ─ ─ ─ ─ ─ ─ ─ ─ ─ ─ ─ ─ ─ ─ ─ ─ ─ ─ ─ ─ ─┘
                         │
                         ▼
┌─────────────────────────────────────────────────┐
│     SUBSEQUENTLY TRANSITION FROM THE RRC INACTIVE │
│          STATE TO THE RRC CONNECTED STATE         │
│                       506                         │
└─────────────────────────────────────────────────┘
                         │
                         ▼
┌─────────────────────────────────────────────────┐
│  RESUME ONE OR MORE MEASUREMENTS ACCORDING TO     │
│  ONE OR MORE MEASUREMENT CONFIGURATIONS STORED    │
│  WHILE THE WIRELESS DEVICE WAS IN THE RRC INACTIVE│
│                      STATE                        │
│                       508                         │
└─────────────────────────────────────────────────┘
```

*FIG. 5*

SUSPENDING/RESUMING MEASUREMENTS IN RRC INACTIVE STATE

TECHNICAL FIELD

The present application is generally related to wireless communication networks and is more particularly related to techniques for handling measurement configurations for RRC connections.

BACKGROUND

Long Term Evolution (LTE) Release 13 introduced a mechanism for the user equipment (UE) to be suspended by the network in a state similar to RRC_IDLE, but with the difference being that the UE stores the Access Stratum (AS) context or Radio Resource Control (RRC) context. This makes it possible to reduce the signaling when the UE is becoming active again, by resuming the RRC connection instead of establishing the RRC connection from scratch. Reducing the signaling could have several benefits, including reduced latency for UEs accessing the Internet and reduced battery consumption for machine-type devices that send very little data. The LTE Release 13 solution is based on the UE sending an RRCConnectionResumeRequest message to the network and, in response, receiving an RRCConnectionResume from the network.

The $3^{rd}$-Generation Partnership Project (3GPP) is developing specifications for the $5^{th}$-generation wireless communications technology commonly referred to as 5G. In the new system and architecture standard for 5G, various state machines are introduced to make sure that a UE is reachable.

The signaling connection over N1 is used to enable Non-Access-Stratum (NAS) signaling exchange between the UE and the core network. It comprises both the AN (Access Node) signaling connection between the UE and the AN and the N2 connection, between the AN and the Access and Mobility Function (AMF). A UE can be in RRC_CONNECTED, RRC_INACTIVE or RRC_IDLE states. A UE is either in RRC_CONNECTED state or in RRC_INACTIVE state when an RRC connection has been established. If this is not the case (i.e., no RRC connection is established), the UE is in RRC_IDLE state.

In RRC_IDLE state, the UE is configured to listen to a paging channel at certain occasions, perform cell (re)selection procedures and listen to system information. In RRC_INACTIVE state, the UE listens to a paging channel, performs cell (re)selection procedures and maintains a connection configuration. The connection configuration is also kept on the network side, such that, when needed (e.g., when data arrives to the UE), it does not require a complete setup procedure to start transmitting data. In RRC_CONNECTED state, there is transfer of data to or from the UE and the network controls the mobility. This means that the network controls when the UE should be handed over to other cells. In RRC_CONNECTED state, the UE still monitors the paging channel and control channels that are associated with whether there is data for the UE or not. The UE provides channel quality and feedback information to the network, performs neighboring cell measurements and reports these measurements to the network.

As part of the standardized work on 5G NR in 3GPP, New Radio (NR) will support RRC_INACTIVE state with some properties that are similar to those of the suspended state in LTE Release 13. RRC_INACTIVE state has slightly different properties from the suspended state in LTE Release 13, in that it is a separate RRC state and not part of RRC_IDLE state like in LTE. Additionally, the core network (CN)/radio access network (RAN) connection (NG or N2 interface) is kept for RRC_INACTIVE state, while it was suspended in LTE. FIG. 1A illustrates a UE state machine and state transitions in NR, and the properties of the NR states are described below.

For RRC_IDLE state: a UE-specific discontinuous reception (DRX) may be configured by upper layers; UE controlled mobility may be based on network configuration; the UE monitors a paging channel for CN paging using an 5G-S-TMSI (Temporary Mobile Subscriber Identity); the UE performs neighboring cell measurements and cell (re)selection; and the UE acquires system information.

For RRC_INACTIVE state: a UE-specific DRX may be configured by upper layers or an RRC layer; UE controlled mobility may be based on network configuration; the UE stores the AS context; the UE monitors a paging channel for CN paging using an 5G-S-TMSI and RAN paging using an I-RNTI (Radio Network Temporary Identifier); the UE performs neighboring cell measurements and cell (re)selection; the UE performs RAN-based notification area updates periodically and when moving outside the RAN-based notification area; and the UE acquires system information.

For RRC_CONNECTED state: the UE stores the AS context; there is a transfer of unicast data to/from UE; and at lower layers, the UE may be configured with a UE specific DRX. For UEs supporting carrier aggregation (CA), one or more Secondary Cells (SCells), aggregated with the Special Cell (SpCell), are used for increased bandwidth. For UEs supporting dual connectivity (DC), the secondary cell group (SCG), aggregated with the master cell group (MCG), is used for increased bandwidth. There is network controlled mobility, i.e., handover within NR and to/from E-UTRAN. The UE monitors a paging channel, monitors control channels associated with the shared data channel to determine if data is scheduled for it, and provides channel quality and feedback information. The UE also performs neighboring cell measurements and measurement reporting and acquires system information.

In the case of an RRC_IDLE state with a release indication, the UE is released by the network with an indication that some of the RRC configurations should be suspended. And, after sending an RRCConnectionResumeRequest and receiving in response an RRCConnectionResume, the UE shall resume some connection procedures using a previously provided connection configuration.

SUMMARY

It is recognized herein that specific UE actions for measurements and measurement related configurations are absent in the standard that specifies the RRC connection actions for the UE (TS 3GPP TS 36.331 v15.0.0). It is not specified how the UE is to handle measurement configurations when the network releases the UE with a suspend indication. And, consequently, it is also not specified what the UE is to do about measurement configurations upon receiving a message resuming the UE.

More specifically, if the UE in NR is suspended from RRC_CONNECTED to RRC_INACTIVE state and resumed from RRC_INACTIVE to RRC_CONNECTED state, there is no clear specification for how a measurement configuration received in RRC_CONNECTED state shall be handled when the UE is suspended to RRC_INACTIVE. For example, TS 36.331 does not specify if MeasConfig, used for measurement configurations, will be reused when the UE resumes the connection and if so, under what conditions. It is assumed that the network (source network node suspending the UE to RRC_INACTIVE state) has to release or suspend (completely or partially) a previously provided measurement configuration when moving the UE to RRC_INACTIVE state. Unfortunately, ambiguities in the standard specifications can lead to UEs behaving differently and the network misbehaving when it comes to re-configuring the UEs upon resumption of a connection.

According to some embodiments, a method, in a wireless device operating in a wireless network, for handling measurement configurations, includes entering an RRC inactive state from a RRC connected state, in response to a message received from the wireless network. The method may include subsequently transitioning from the RRC inactive state to the RRC connected state and resuming one or more measurements according to one or more measurement configurations stored while the wireless device was in the RRC inactive state.

According to some embodiments, a wireless device configured to handle measurement configurations includes transceiver circuitry and processing circuitry operatively associated with the transceiver circuitry. The processing circuitry is configured to enter an RRC inactive state from an RRC connected state, in response to a message received from the wireless network. The processing circuitry is also configured to subsequently transition from the RRC inactive state to the RRC connected state and resume one or more measurements according to one or more measurement configurations stored while the wireless device was in the RRC inactive state.

According to some embodiments, a method, in one or more nodes in or connected to a wireless network, for providing for handling of measurement configurations, includes configuring a wireless device to, upon transitioning from an RRC inactive state to an RRC connected state, resume one or more measurements according to one or more measurement configurations stored while the wireless device was in the RRC inactive state.

According to some embodiments, one or more nodes in or connected to a wireless network, configured to handle measurement configurations, includes transceiver circuitry and processing circuitry operatively associated with the transceiver circuitry. The processing circuitry is configured to configure a wireless device to, upon transitioning from an RRC inactive state to an RRC connected state, resume one or more measurements according to one or more measurement configurations stored while the wireless device was in the RRC inactive state.

The embodiments can provide advantages. For example, releasing all measurement configurations upon the UE entering RRC_INACTIVE state can be seen as an advantage in some cases, such as when the source node suspends the UE in order to simplify the UE re-configuration in the target node, which may likely have a different measurement configuration. In that case, upon context fetching, the target node does not need to first understand the MeasConfig the UE has stored, according to the fetched UE context, and apply delta signaling to it. Storing all measurement configurations, on the other hand, makes it possible to reduce to the minimum the size of the message resuming the UE (RRCResume message), as the network can apply a delta signaling as any ordinary handover.

Some embodiments, where only a few parameters are either stored or released, provide the network the flexibility to decide which parameters the UE shall release and/or store, depending on the network's implementation. This may include whether the network applies delta signaling or a full configuration. For example, a beam measurement configuration may be particularly interesting when measurements on certain carriers are configured. Hence, as UEs may be performing inter-frequency cell reselection, due to spotty NR coverage, it might be better to release the beam measurement related configuration.

In another example, a measurement configuration can be used for idle or inactive state measurements. For example, the UE can use the parameters for cell quality derivation provided in connected mode (e.g., consolidation threshold, maximum number of beams to be averaged, etc.) to perform cell quality measurements in RRC_INACTIVE state.

When it comes to providing a framework for suspending measurements, in particular a subset of measurements previously configured, the framework can be useful for only enabling certain measurements in RRC_INACTIVE state that the network wants the UE to report upon resuming, such as for better DC or CA setup. When it comes to providing a framework for resuming measurements, that can be useful for simplifying certain network implementations that may prefer to rely on full configuration or at least enable certain nodes in a network to act similarly. The techniques disclosed herein are applicable to both LTE and NR as well as other future technologies.

Further aspects of the present invention are directed to an apparatus, a wireless device (e.g., UE), one or more nodes, computer program products or computer readable storage medium corresponding to the methods summarized above and functional implementations of the above-summarized apparatus and wireless device.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE FIGURES

FIG. 5 is a process flow diagram illustrating an example method according to some embodiments, as carried out in the wireless device.

DETAILED DESCRIPTION

The presently disclosed techniques are described in the context of 5GS wireless communications standards. It will be appreciated, however, that the techniques may be generally applicable to other wireless communications networks, such as an LTE network. For the purpose of understanding the scope of the presently disclosed techniques and apparatuses, a wireless device may be a UE. However, these terms should be understood more generally, as referring to wireless devices configured to operate as access terminals in a wireless communication network, whether those wireless devices are consumer-oriented devices such as cellular telephones, smartphones, wireless-equipped laptops, tablets, or the like, or machine-to-machine (M2M) devices for use in industrial applications or in enabling the Internet of Things (IoT). Likewise, the terms gNB, should be understood to refer generally to base stations or access network nodes in a wireless communications system.

Figure 1A:
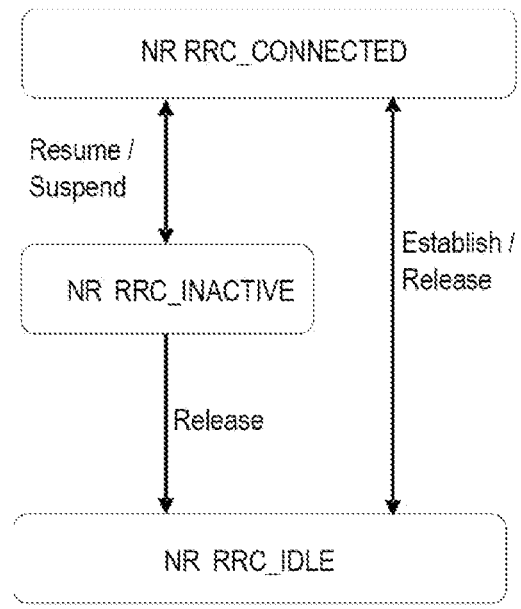
FIG. 1A illustrates a UE state machine and state transitions in NR.
Figure 1B:
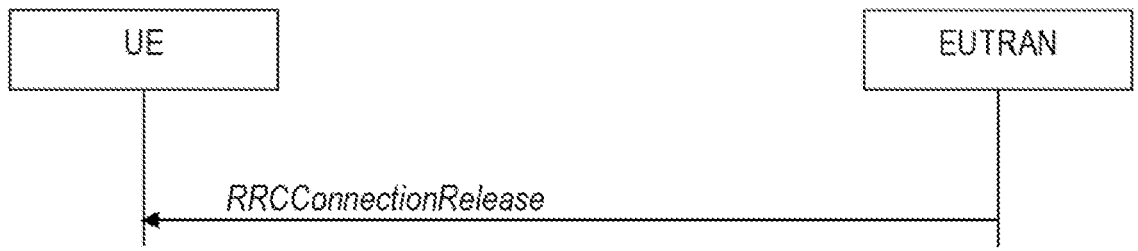
FIG. 1B illustrates an RRC connection release.

FIG. 1B shows an RRC connection release, which is described in 3GPP TS 36.331 v15.0.0. What is missing from this description is any specification of what happens to the measurement related configurations when the UE is suspended and when the UE tries to resume the RRC connection. For example, there is no description of how the UE should use a previously provided measurement configuration, stored when the UE was suspended, when the UE starts performing measurements. The text of TS 36.331 mentions that signaling radio bearers (SRBs) and data radio bearers (DRBs) are resumed, but nothing about previously configured measurements being resumed. The text of TS 36.331 mentions that MeasConfig can be included in the RRCConnectionResume message, but this basically states that the UE shall perform a measurement configuration procedure. The text does not state what the UE does when the MeasConfig is not present in the message, and there is nothing in the text about the use of a measurement configuration that was stored while the UE was in RRC_INACTIVE state.

Embodiments of the present invention specify that the UE, subsequent to transitioning to an RRC connected state, resumes measurement configurations stored while the UE was in an RRC inactive state. Some embodiments also introduce a mechanism in the UE for handling measurement configurations and measurement related actions when the UE enters an RRC inactive state and when the UE is resumed and enters an RRC connected state. In an example embodiment, a method in the UE includes receiving a measurement configuration while in RRC_CONNECTED and performing measurements accordingly. The method then includes entering RRC_INACTIVE state by reception of a message sent by a source network node, such as via an RRCSuspend message or RRCRelease message with a suspend indication. The method further includes, upon entering RRC_INACTIVE state, performing a set of actions related to the handling of measurement configurations during this transition from RRC_CONNECTED to RRC_INACTIVE. This can include suspending measurements, partially or totally. This can also include perform a set of actions related to the handling of measurement configurations such as releasing upon different triggers. The method may also include, upon transitioning from RRC_INACTIVE to RRC_CONNECTED, handling stored measurement configurations stored while the UE was in RRC_INACTIVE and resuming measurements.

In some embodiments, the method may also include performing one or more of the following steps: responsive to or in conjunction with entering the RRC inactive state, performing a set of actions related to handling of previously received measurement configurations; responsive to or in conjunction with entering the RRC inactive state, suspending one or more previously configured measurements; and while in the RRC inactive state, performing a set of actions related to the handling of previously received measurement configurations.

On the network side, according to some embodiments, the method in one or more nodes in or connected to a wireless network, configured for providing for handling of measurement configurations, comprises configuring the UE to, upon transitioning from an RRC inactive state to an RRC connected state, resume one or more measurements according to one or more measurement configurations stored while a UE was in the RRC inactive state. For example, a UE transitioning from RRC_INACTIVE state to RRC_CONNECTED state may be configured to handle stored measurement configurations, stored while the UE was in RRC_INACTIVE state. Newly provided measurement configurations may also be provided in the RRCResume message by the network. Upon transitioning from RRC_INACTIVE state to RRC_CONNECTED state, the UE may be instructed to resume fully or partially its measurements, including with measurement configurations stored before the UE resumes RRC_CONNECTED state.

The one or more network nodes may also perform other actions, when the UE had transitioned from the earlier RRC connected state to the RRC inactive state, including providing a measurement configuration to an RRC_CONNECTED UE (or a UE entering RRC_CONNECTED); moving a UE to RRC_INACTIVE state, by sending an RRCSuspend message or an RRCRelease message with a suspend indication; configuring a UE entering RRC_INACTIVE state to perform a set of actions related to the handling of measurement configurations during this transition from RRC_CONNECTED state to RRC_INACTIVE state; configuring a UE entering RRC_INACTIVE state to suspend measurements, partially or totally; configuring a UE entering RRC_INACTIVE state with triggers so that while in RRC_INACTIVE state, the UE performs a set of actions related to the handling of measurement configurations such as releasing upon different triggers.

Accordingly, a corresponding embodiment in the network node or nodes may include a method for handling of measurement configurations. The method includes configuring a wireless device entering an RRC inactive state from a RRC connected state to perform one or more of the following: a set of actions related to the handling of measurement configurations responsive to or in conjunction with entering the RRC inactive state; a suspension of one or more previously configured measurements, responsive to or in conjunction with entering the RRC inactive state; and a set of actions related to the handling of measurement configurations while in the RRC inactive state.

In NR, MeasConfig may be tailored quite differently than in LTE, depending on different variables such as the need for gaps depending on the serving frequencies the UE is configured to measure, the need for beam reporting (mainly applicable in higher frequencies and/or if handover algorithms support that input), the reference signal (RS) type (synchronization signal block (SSB) or channel state information RS (CSI-RS)) that are configured for the different events, the potential MeasConfig that may exist for the different bandwidth parts the UE may be configured with, etc.

Figure 2:
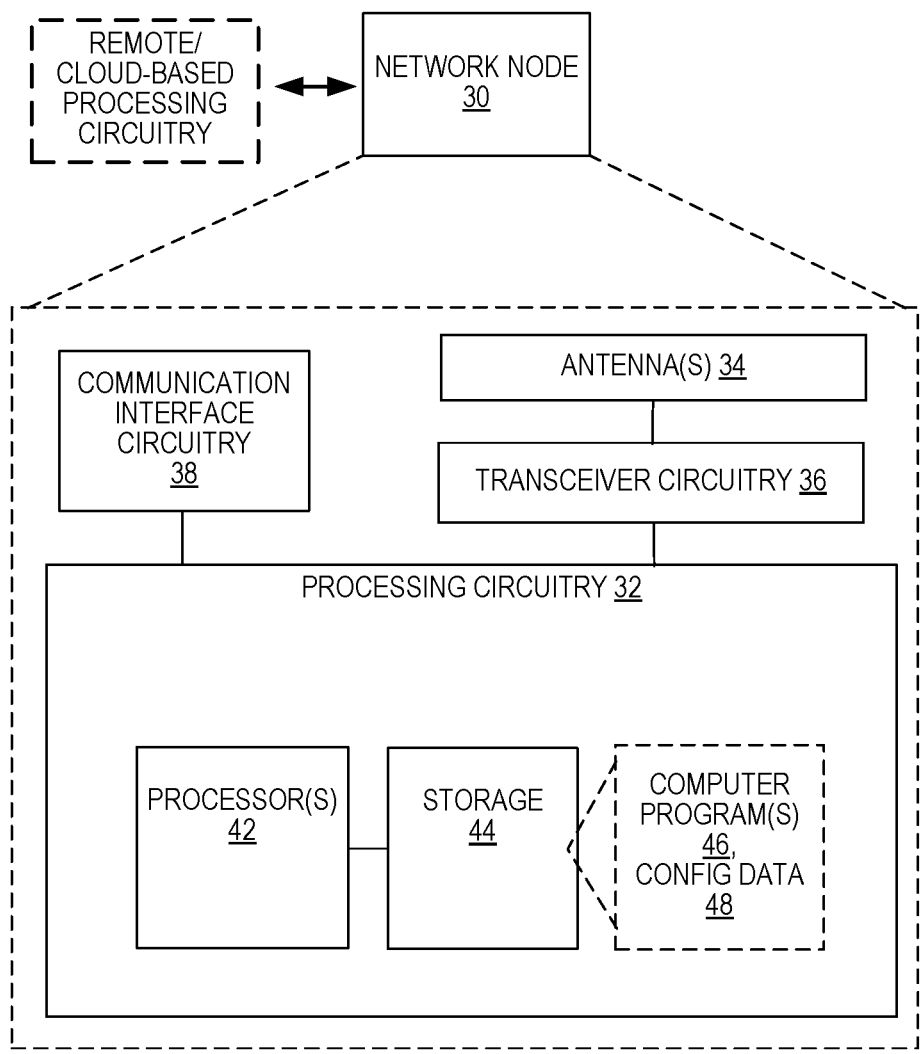
FIG. 2 is a block diagram illustrating an example network node, according to some embodiments.

FIG. 2 is a block diagram illustrating an example network node 30 that may be configured to handle measurement configurations as described above. The network node 30 may be one of multiple network nodes in a cloud-based system that carry out the described techniques. The network node 30 may be, for example, an eNB or a 5G gNB. The network node 30 provides an air interface to a wireless device, e.g., 5G air interface for downlink transmission and uplink reception, which is implemented via antennas 34 and transceiver circuitry 36. The transceiver circuitry 36 includes transmitter circuits, receiver circuits, and associated control circuits that are collectively configured to transmit and receive signals according to a radio access technology, for the purposes of providing cellular communication, or WLAN services if necessary. According to various embodiments, cellular communication services may be operated according to any one or more of the 3GPP cellular standards, GSM, GPRS, WCDMA, HSDPA, LTE, LTE-Advanced and 5G. The network node 30 also include communication interface circuitry 38 for communicating with nodes in the core network, other peer radio nodes, and/or other types of nodes in the network.

The network node 30 also includes one or more processing circuits 32 that are operatively associated with and configured to control the communication interface circuitry 38 and/or the transceiver circuitry 36. The processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any combination thereof. More generally, the processing circuitry 32 may comprise fixed circuitry, or programmable circuitry that is specially configured via the execution of program instructions implementing the functionality taught herein, or may comprise some combination of fixed and programmable circuitry. The processor(s) 42 may be multi-core.

The processing circuitry 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any combination thereof. By way of non-limiting example, the memory 44 may comprise any one or more of SRAM, DRAM, EEPROM, and FLASH memory, which may be in the processing circuitry 32 and/or separate from the processing circuitry 32. In general, the memory 44 comprises one or more types of computer-readable storage media providing non-transitory storage of the computer program 46 and any configuration data 48 used by the network node 30. Here, "non-transitory" means permanent, semi-permanent, or at least temporarily persistent storage and encompasses both long-term storage in non-volatile memory and storage in working memory, e.g., for program execution.

In some embodiments, the processing circuitry 32 of one or more network nodes 30 connected to a wireless network is configured to perform operations for handling of measurement configurations. The processing circuitry 32 is configured to configure a wireless device entering an RRC inactive state from a RRC connected state to perform one or more of the following: a set of actions related to the handling of measurement configurations responsive to or in conjunction with entering the RRC inactive state; a suspension of one or more previously configured measurements, responsive to or in conjunction with entering the RRC inactive state; and a set of actions related to the handling of measurement configurations while in the RRC inactive state.

According to some embodiments, the processing circuitry 32 is also configured to, upon transitioning from an RRC inactive state to an RRC connected state, resume one or more measurements according to one or more measurement configurations stored while the wireless device was in the RRC inactive state. It will be appreciated that the configuring operation described above may include configuring the wireless device to operate according to any of the variants described below for the wireless device.

Figure 3:
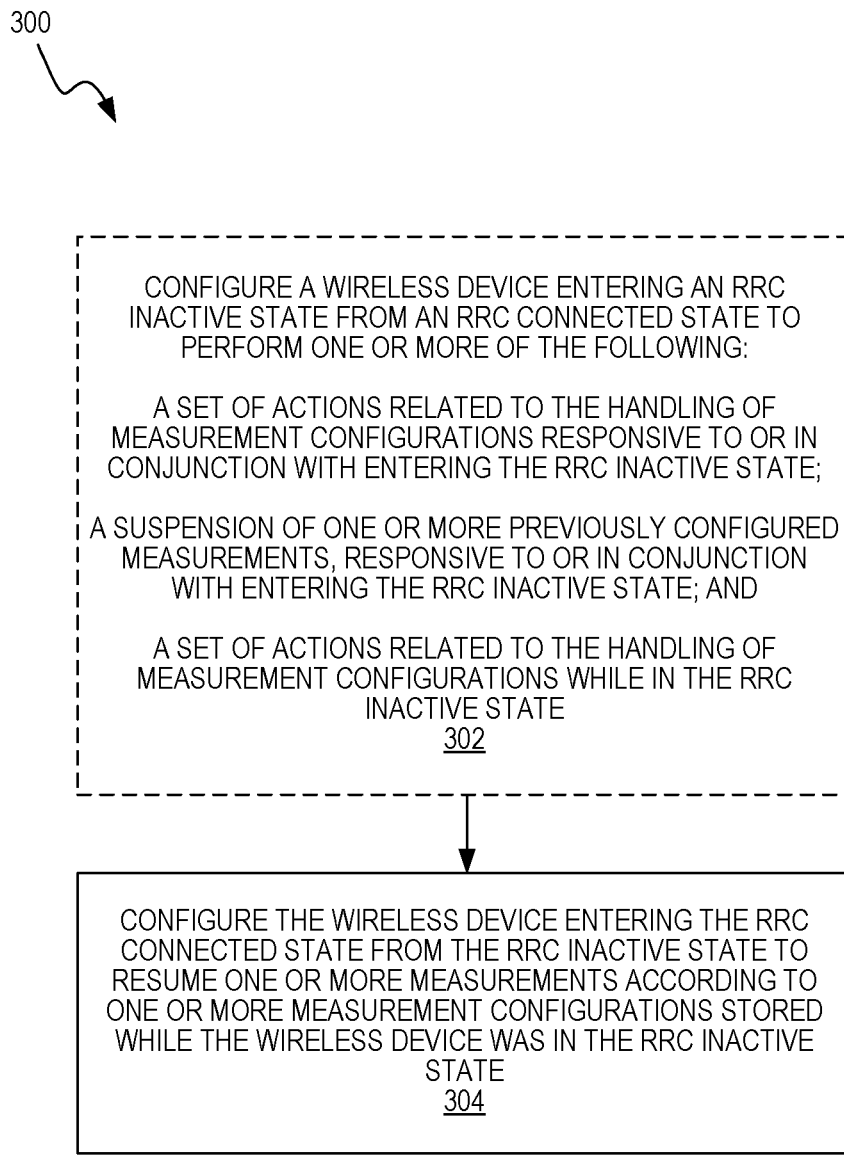
FIG. 3 is a process flow diagram illustrating an example method according to some embodiments, as carried out in one or more nodes, such as the network node of FIG. 2.

The processing circuitry 32 is also configured to perform a corresponding method 300, as shown in FIG. 3. Method 300 in one or more nodes 30 in or connected to a wireless network, for providing for handling of measurement configurations, may optionally include configuring a wireless device entering an RRC inactive state from a RRC connected state to perform one or more of the following: a set of actions related to the handling of measurement configurations responsive to or in conjunction with entering the RRC inactive state; a suspension of one or more previously configured measurements, responsive to or in conjunction with entering the RRC inactive state; and a set of actions related to the handling of measurement configurations while in the RRC inactive state (block 302). Method 300 includes configuring a wireless device to, upon transitioning from an RRC inactive state to an RRC connected state, resume one or more measurements according to one or more measurement configurations stored while the wireless device was in the RRC inactive state (block 304).

Figure 4:
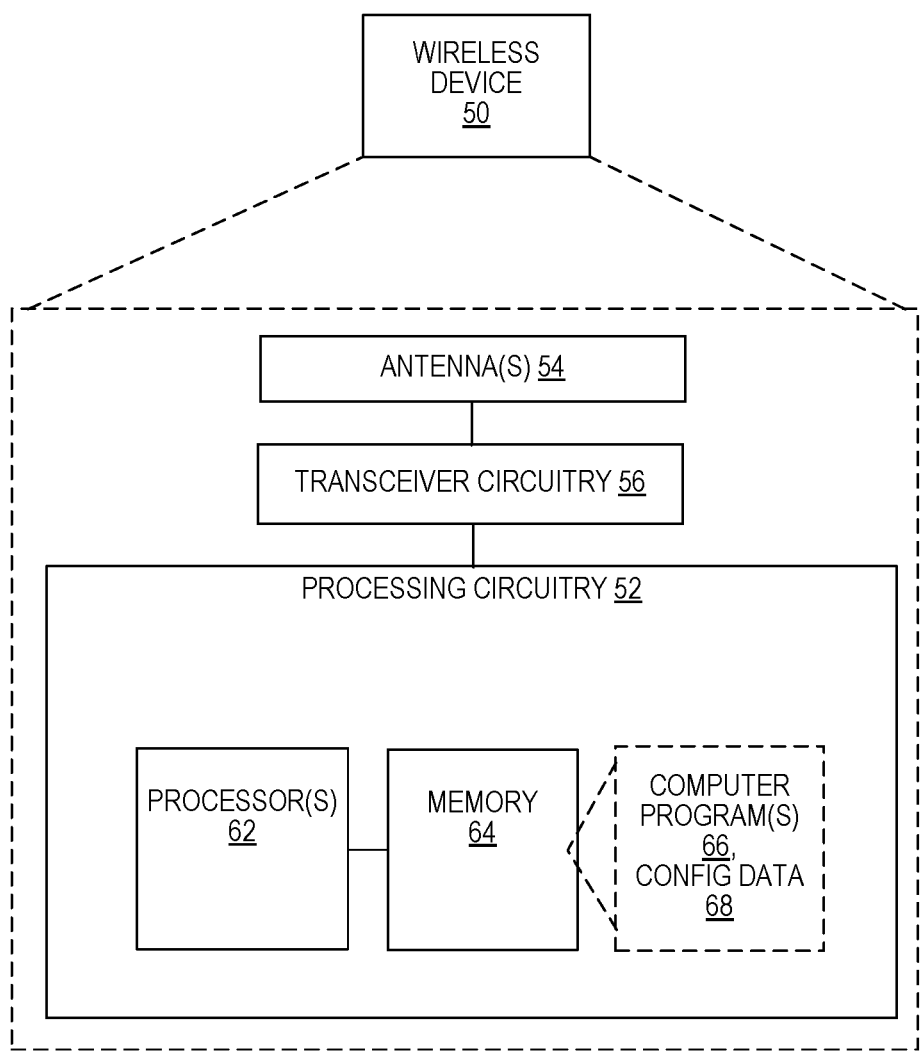
FIG. 4 is a block diagram illustrating an example wireless device, according to some embodiments.

FIG. 4 illustrates an example of the corresponding wireless device 50 that is configured to perform the techniques described herein for the wireless device for handling measurement configurations. The wireless device 50 may also be referred to, in various contexts, as a radio communication device, a UE, a target device, a device-to-device (D2D) UE, a machine-type UE or UE capable of machine to machine (M2M) communication, a sensor-equipped UE, a PDA (personal digital assistant), a wireless tablet, a mobile terminal, a smart phone, laptop-embedded equipment (LEE), laptop-mounted equipment (LME), a wireless USB dongle, a Customer Premises Equipment (CPE), etc.

The wireless device 50 communicates with one or more radio nodes or base stations, such as one or more network nodes 30, via antennas 54 and a transceiver circuitry 56. The transceiver circuitry 56 may include transmitter circuits, receiver circuits, and associated control circuits that are collectively configured to transmit and receive signals according to a radio access technology, for the purposes of providing cellular communication services.

The wireless device 50 also includes one or more processing circuits 52 that are operatively associated with and control the radio transceiver circuitry 56. The processing circuitry 52 comprises one or more digital processing circuits, e.g., one or more microprocessors, microcontrollers, DSPs, FPGAs, CPLDs, ASICs, or any mix thereof. More generally, the processing circuitry 52 may comprise fixed circuitry, or programmable circuitry that is specially adapted via the execution of program instructions implementing the functionality taught herein, or may comprise some mix of fixed and programmed circuitry. The processing circuitry 52 may be multi-core.

The processing circuitry 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuitry 52 and/or separate from processing circuitry 52. In general, the memory 64 comprises one or more types of computer-readable storage media providing non-transitory storage of the computer program 66 and any configuration data 68 used by the wireless device 50.

Accordingly, in some embodiments, the processing circuitry 52 of the wireless device 50 is configured to operate in a wireless network and handle measurement configurations, by entering an RRC inactive state from a RRC connected state, in response to a message received from the wireless network. The processing circuitry 52 is configured to perform one or more of the following steps: responsive to or in conjunction with entering the RRC inactive state, perform a set of actions related to handling of previously received measurement configurations; responsive to or in conjunction with entering the RRC inactive state, suspend one or more previously configured measurements; and while in the RRC inactive state, perform a set of actions related to the handling of previously received measurement configurations.

In some embodiments, the processing circuitry 52 is configured to subsequently transition the wireless device 50 from the RRC inactive state to the RRC connected state and resume one or more measurements according to one or more measurement configurations stored while the wireless device 50 was in the RRC inactive state.

FIG. 5 is a process flow diagram illustrating a corresponding method 500 implemented in the wireless device 50 for handling measurement configurations. Method 500 includes entering an RRC inactive state from a RRC connected state, in response to a message received from the wireless network (block 502). Method 500 may include performing one or more of the following steps: responsive to or in conjunction with entering the RRC inactive state, performing a set of actions related to handling of previously received measurement configurations; responsive to or in conjunction with entering the RRC inactive state, suspending one or more previously configured measurements; and while in the RRC inactive state, performing a set of actions related to the handling of previously received measurement configurations (block 504). Method 500 also includes subsequent to entering the RRC inactive state, transitioning from the RRC inactive state to the RRC connected state (block 506) and resuming one or more measurements according to one or more measurement configurations stored while the wireless device 50 was in the RRC inactive state (block 508). The one or more measurement configurations may have been stored as part of an action performed in block 504.

The resuming may be performed selectively, in response to receiving an RRCResume message that does not include a new measurement configuration. The resuming of the measurements may be according to one or more measurement configurations stored while the wireless device was in the RRC inactive state and may be performed despite receiving an RRCResume message that includes a new measurement configuration. The resuming of the measurements according to one or more stored measurement configurations may also include adjusting one or more of the stored measurement configurations with measurement configuration information included in an RRCResume message received while in the RRC inactive state.

In some embodiments, performing the set of actions related to handling of previously received measurement configurations responsive to or in conjunction with entering the RRC inactive state may include storing all or a subset of measurement configurations existing as of entering the RRC inactive state. The storing may then be performed selectively, in response to receiving an indication that the measurement configurations or subset of measurement configurations should not be released. The storing may also include storing all existing measurement configurations except for one or more fields explicitly indicated to the wireless device.

In some embodiments, performing the set of actions related to handling of previously received measurement configurations responsive to or in conjunction with entering the RRC inactive state may include releasing all or a subset of measurement configurations existing as of entering the RRC inactive state. The releasing may be performed selectively, in response to receiving an indication that the measurement configurations or subset of measurement configurations should be released. The releasing may also include releasing all existing measurement configurations except for one or more fields explicitly indicated to the wireless device.

In some embodiments, the suspending may be performed selectively, in response to receiving an indication that measurements should be suspended. The suspending may include suspending all existing measurements except for one or more measurements explicitly indicated to the wireless device.

In some embodiments, performing the set of actions related to the handling of previously received measurement configurations while in the RRC inactive state may include releasing all or one or more parts of stored measurement configurations in response to one or more a predefined set of triggering events. The predefined set of triggering events may include any one or more of the following: a cell reselection; a cell reselection within NR and with LTE cells connected to 5GC; intra-RAT cell reselection; inter-frequency cell reselection; expiration of a timer, configured by RRC (e.g., in an RRCSuspend message); entering a new RAN area; performing of periodic RAN Area updates; an attempt to resume (e.g., by sending an RRCResumeRequest) and receiving an RRC Connection Setup message (resume fallback procedure); and a change in cell coverage (e.g., by detecting that a set of downlink beams covering the wireless device has changed).

According to some embodiments, the following measurement configuration IE MeasConfig from an RRC specification may be assumed. Hence, any field or set of fields in the IE shown below can be considered as "one measurement configuration" in the context of partial measurement configuration. Note that the example is provided for illustrative purposes, while some embodiments may cover extensions of the use of the MeasConfig IE, where new fields in that message can also be handled by the embodiments. The MeasConfig IE specifies measurements to be performed by the UE, and covers intra-frequency, inter-frequency and inter-RAT mobility, as well as configuration of measurement gaps. An example of the MeasConfig IE is as follows:

```
ASN1START
-- TAG-MEAS-CONFIG-START
MeasConfig ::=       SEQUENCE {
    -- Measurement objects
    measObjectToRemoveList
    MeasObjectToRemoveList
                                         OPTIONAL,  -- Need N
    measObjectToAddModList
    MeasObjectToAddModList
                                         OPTIONAL,  -- Need N
    -- Reporting configurations
    reportConfigToRemoveList
    ReportConfigToRemoveList
                                         OPTIONAL,  -- Need N
    reportConfigToAddModList
    ReportConfigToAddModList
                                         OPTIONAL,  -- Need N
    -- Measurement identities
    measIdToRemoveList
    MeasIdToRemoveList
                                         OPTIONAL,  -- Need N
    measIdToAddModList
    MeasIdToAddModList
                                         OPTIONAL,  -- Need N
    -- Other parameters
    --s-Measure config
    s-MeasureConfig
    CHOICE {
        ssb-RSRP
        RSRP-Range,
        csi-RSRP
        RSRP-Range
    }
                                         OPTIONAL,  -- Need M
    quantityConfig
    QuantityConfig
                                         OPTIONAL,  -- Need M
    --Placehold for measGapConfig
    measGapConfig
    MeasGapConfig
                                         OPTIONAL,  -- Need M
    ...
}
MeasObjectToRemoveList::=       SEQUENCE (SIZE
(1.. maxNrofObjectId)) OF MeasObjectId
MeasIdToRemoveList ::=       SEQUENCE (SIZE (1..maxNrofMeasId))
OF MeasId
ReportConfigToRemoveList ::=       SEQUENCE (SIZE
(1..maxReportConfigId)) OF ReportConfigId
-- TAG-MEAS-CONFIG-STOP
-- ASN1STOP
```

In various embodiments, a measurement configuration may refer to or include at least one field in a measurement configuration maintained by the UE, following the structure shown above (especially if the UE is not in any kind of Dual Connectivity when suspended). A measurement configuration may also refer to or include the whole structure as shown above, associated with a given Special Cell (SpCell) (Primary Cell (PCell), a Primary Secondary Cell (PSCell) or any primary cell in a given cell group in the case of multi-connectivity) or radio access technology (RAT) (e.g., NR, LTE, any other 3GPP RAT, any other non-3GPP RAT) or system. For example, a UE in inter-RAT Dual Connectivity, like in EN-DC (EUTRAN/NR-Dual Connectivity), could have two measurement configurations. Hence, storing a measurement configuration may refer to storing one field in a measurement configuration or a whole measurement configuration associated with one RAT.

The following are various actions that a UE may take, according to some embodiments. In a first example action, upon entering RRC_INACTIVE state, the UE may perform a set of actions related to the handling of measurement configurations during this transition from RRC_CONNECTED state to RRC_INACTIVE state. This may be one of the following actions or a combination of them. A first action is to store all the existing measurement configurations (fields) in the UE's current MeasConfig. In one instance, the UE always performs that action upon entering RRC_INACTIVE state, In another instance, the UE performs that action upon entering RRC_INACTIVE state if the RRCSuspend (or equivalent) message contains an indication for not releasing the MeasConfig. In another solution, the UE performs that action upon entering RRC_INACTIVE state if the latest message containing a MeasConfig (e.g., RRCReconfiguration message) contains an indication for not releasing the MeasConfig upon entering RRC_INACTIVE state. The UE may store all the existing measurement configurations except the fields explicitly indicated. That explicit indication may be provided in the message suspending the UE to RRC_INACTIVE state for each field (RRCSuspend). In another instance, that explicit indication may be provided in each MeasConfig IE the UE may receive, indicating for each field whether they shall be released or not upon entering RRC_INACTIVE state, or until any other explicit indication that they shall be released. The UE may store a subset of pre-defined measurement configurations. This may be predefined in the specifications, for example, via need codes of the fields.

Some stored measurement configurations may be discarded. The UE may release all the existing measurement configurations. In one case, the UE always performs that action upon entering RRC_INACTIVE. In another case, the UE performs that action upon entering RRC_INACTIVE if the RRCSuspend (or equivalent) message contains an indication for releasing the whole MeasConfig (all measurement configurations). In another case, the UE performs that action upon entering RRC_INACTIVE state if the latest message containing a MeasConfig (e.g. RRCReconfiguration message) contains an indication for releasing the MeasConfig upon entering RRC_INACTIVE state.

In some cases, the UE may release all the existing measurement configurations except the fields explicitly indicated. That explicit indication may be provided in the message suspending the UE to RRC_INACTIVE state for each field (RRCSuspend). In another instance, that explicit indication may be provided in each MeasConfig IE the UE may receive, indicating for each field that they shall not be released upon entering RRC_INACTIVE state. In other cases, the UE releases a subset of pre-defined measurement configurations. This may be predefined in the specifications, for example, via need codes of the fields. There can be different need codes for entering RRC_IDLE state compared to RRC_INACTIVE state.

For UEs configured with any form of DC or multi-connectivity when the UE is being transition from RRC_CONNECTED state to RRC_INACTIVE state, the UE may have one MeasConfig associated with each cell group (which can be from different RATs). In that case, a measurement configuration, as described above, can be interpreted as associated with a cell group. Hence, the previous description is still applicable. On top of that, in that DC case, a measurement configuration can also be interpreted as one field in each MeasConfig associated with a cell group, where the previous description is applicable too.

"Releasing all" measurement configurations upon entering RRC_INACTIVE can be seen as an advantage at least in some cases, e.g., if the source node (that is suspending the UE) aims to simplify the UE re-configuration in the target node, which may likely have a different measurement configuration. In that case, upon context fetching, the target node does not need to first understand the MeasConfig the UE has stored, according to the fetched UE context, and apply delta signaling to it. "Storing all" on the other hand, provides the possibility of reducing the minimum size of the message resuming the UE (e.g., RRCResume message), as the network can apply a delta signaling as any ordinary handover.

The different variants where only a few parameters are either stored or released provide the network the flexibility to decide which parameters the UE shall release and/or store, depending on network's implementation. This may include whether the network applies delta signaling or a full configuration. For example, beam measurement configuration may be particularly interesting when measurements on certain carriers are configured. Hence, as UEs may be performing inter-frequency cell reselection due to spotty NR coverage, it might be better to release the beam measurement related configuration.

Another example of how measurement configuration can be used is its usage for idle or inactive mode measurements. For example, the UE may use the parameters for cell quality derivation provided in connected mode (e.g., consolidation threshold, maximum number of beams to be averaged, etc.) to perform cell quality measurements in RRC_INACTIVE state.

In a second example action, the UE may, upon entering RRC_INACTIVE state, suspend measurements, partially or totally. With regard to suspending all measurements, in one case, the UE always performs that action upon entering RRC_INACTIVE state. In another case, the UE performs that action upon entering RRC_INACTIVE state if the RRCSuspend (or equivalent) message contains an indication for suspending measurements. Otherwise, the UE keeps performing measurements. In another case, the UE performs that action upon entering RRC_INACTIVE state if the latest message containing a MeasConfig (e.g., a RRCReconfiguration message) contains an indication for not suspending measurements upon entering RRC_INACTIVE state.

The UE may suspend all the existing measurement configurations, except for the fields explicitly indicated. That explicit indication may be provided in the message suspending the UE to RRC_INACTIVE state for each field (RRCSuspend). In another case, that explicit indication may be provided in each MeasConfig IE the UE may receive, indicating for each field whether they shall be released or not upon entering RRC_INACTIVE state, or until any other explicit indication that they shall be released. Not suspending all measurements may be useful in the case where the network wants to instruct an RRC_INACTIVE UE to perform measurements and report them so the network can take educated decisions to perform Dual Connectivity and/or Carrier aggregation, even before it resumes the RRC connection. These measurements could be reported: when the UE is resuming an RRC connection (e.g., multiplexed with or after RRCResumeRequest or multiplexed with or after RRCResumeComplete); or when the UE is resuming an RRC connection (e.g., multiplexed with or after RRCResumeRequest).

The UE may also suspend a subset of pre-defined measurement configurations. This may be predefined in the specifications, for example, via need codes of the fields. Upon suspending measurements, the UE deletes all previously performed measurements and resets measurement related timers and variables.

In a third example action, the UE may, while in RRC_INACTIVE state, perform a set of actions related to the handling of measurement configurations, such as releasing upon different triggers. In the first example action, a set of actions related to the release of measurement configurations depends on what is indicated in the RRCSuspend message (or equivalent message). Here, in the third example action, the full release of a stored measurement configuration and/or parts of a stored measurement configuration is triggered by different events while the UE is in RRC_INACTIVE state, where these events can either be pre-defined or configured by the network (e.g., in the RRCSuspend message). Examples of the events that can trigger the UE to release its measurement configurations, including release upon: triggering any form of cell reselection; triggering any form of cell reselection within NR and with LTE cells connected to 5GC; triggering intra-RAT cell reselection; triggering inter-frequency cell reselection; the expiration of a timer configured by RRC (e.g., in the RRCSuspend message); entering a new RAN Area (i.e., before performing a RAN-base notification area (RNA) update); performing periodic RAN Area updates; trying to resume the connection (e.g., by sending an RRCResumeRequest message) and then receiving an RRC Connection Setup (resume fallback procedure); or changing the cell coverage (e.g., by detecting that a set of downlink beams covering the UE have changed). Note that at least some of these action triggers can also be detected by the network (e.g., RNA updates, expiration of timers, etc.). Hence, when the network retrieves the UE context of a UE trying to resume the RRC connection, the network knows whether the UE has a measurement configuration stored and, whether it can apply delta signaling.

In a fourth example action, the UE may, upon transitioning from RRC_INACTIVE state to RRC_CONNECTED state, handle measurement configurations stored while the UE was in RRC_INACTIVE state. Upon receiving the RRCResume message, or any equivalent message instructing the UE to resume the RRC connection and enter RRC_CONNECTED state, the UE applies its stored measurement configurations. In one case, if the RRCResume message does not contain MeasConfig, the UE considers its stored MeasConfig as the current one. Else, if the RRCResume message contains a MeasConfig, the UE overrides its stored MeasConfig with the newly provided one. In another case, if the RRCResume message does not contain MeasConfig, the UE considers its stored MeasConfig as the current one. Else, if the RRCResume message contains a MeasConfig, the UE applies delta signaling to its stored MeasConfig with the newly provided one.

The RRCResume message, or any equivalent message instructing the UE to resume the RRC connection and enter RRC_CONNECTED state, may also contain instructions to the UE for releasing measurement configurations so that further measurement configurations do not need to apply delta signaling (i.e., signaling that only indicates changes in a configuration).

In a fifth example action, the UE, upon transitioning from RRC_INACTIVE state to RRC_CONNECTED state, resumes measurements. The method comprises actions related to resuming measurements when the UE is transiting from RRC_INACTIVE state to RRC_CONNECTED state. In one case, the reception of an RRCResume message triggers the UE to resume all measurements according to its stored measurement configurations. In another case, after the reception of an RRCResume message, the UE first waits until it enters RRC_CONNECTED state and then transition triggers the UE to resume all measurements according to its stored measurement configurations. In another case, after the reception of an RRCResume message, the UE first waits until it enters RRC_CONNECTED state, and then transition triggers the UE to resume all measurements according to the measurement configurations that are the outcome of the delta signaling action, as described in the fourth example action.

As a response to an RRCResumeRequest message, the network may respond with other messages that are not an RRCResume message. In one case related to measurement configurations and measurements, where the UE receives an RRCReject message with wait time, the UE maintains its stored measurement configurations. In another case, the UE releases its stored measurement configurations. In another case, all measurements related to reporting upon entering RRC_CONNECTED state are suspended. In another solution, all measurements are resumed while waitTime is running.

Upon receiving an RRCRelease message, the UE may release its stored measurement configurations. Upon receiving an RRCSuspend message, the UE may not release its stored measurement configurations. In another case, the UE releases its stored measurement configurations. In another case, that message may contain a MeasConfig and any of the previously described actions upon receiving a MeasConfig and having a stored MeasConfig can be applied in this case.

Figure 6:
FIG. 6 is a signal flow for RRC connection suspend, according to some embodiments.

A possible implementation in the RRC specifications is shown below, where it can be assumed that the UE stores all measurement configurations, or at least the ones with code indicated to be M (maintain). Then, upon entering RRC_INACTIVE state, the UE may always suspend its measurements. FIG. 6 illustrates an RRC connection suspend message. Then, upon resuming, when receiving an RRCResume message, the UE may resume all measurements according to a measurement configuration resulting from the stored MeasConfig and the provided MeasConfig (if provided), possibly with a delta signaling.

Begin proposed changes to the standard (in bold)
5.3.14.1 General
The purpose of this procedure is:
to suspend the RRC connection, which includes the suspension of the established radio bearers.
5.3.14.2 Initiation
The network initiates the RRC connection suspend procedure to a UE in
RRC_CONNECTED or RRC_INACTIVE.
5.3.14.3 Reception of the RRCSuspend by the UE
The UE shall:
1> delay the following actions defined in this sub-clause X ms from the moment the RRCSuspend message was received or optionally when lower layers indicate that the receipt of the RRCSuspend message has been successfully acknowledged, whichever is earlier;

Editor's Note: How to set the value of X (whether it is configurable, or fixed to 60 ms as in LTE, etc.).
1> if the RRCSuspend message includes the idleMode-MobilityControlInfo:
   2> store the cell reselection priority information provided by the inactiveModeMobilityControlInfo;
   2> if the t320 is included:
      3> start timer T320, with the timer value set according to the value of t320;
1> else:
   2> apply the cell reselection priority information broadcast in the system information;
1> store the following information provided by the network: resumeIdentity, nextHopChainingCount, ran-PagingCycle and ran-NotificationAreaInfo;
1> re-establish RLC entities for all SRBs and DRBs;
1> except if the RRCSuspend message was received in response to an RRCResumeRequest:
   2> store the UE AS Context including the current RRC configuration such as measConfig, the current security context, the PDCP state including ROHC state, C-RNTI used in the source PCell, the cellIdentity and the physical cell identity of the source PCell;
1> suspend all SRB(s) and DRB(s), except SRB0;
1> start timer T380, with the timer value set to periodic-RNAU-timer;
1> indicate the suspension of the RRC connection to upper layers;
1> configure lower layers to suspend integrity protection and ciphering;
1> enter RRC_INACTIVE and perform procedures as specified in TS 38.304
[ffsReference]
5.3.13.4 Reception of the RRCResume by the UE
The UE shall:
1> stop timer T300;
1> restore the PDCP state and re-establish PDCP entities for SRB2 and all DRBs;
1> if drb-ContinueROHC is included:
   2> indicate to lower layers that stored UE AS context is used and that drb-ContinueROHC is configured;
   2> continue the header compression protocol context for the DRBs configured with the header compression protocol;
1> else:
   2> indicate to lower layers that stored UE AS context is used;
   2> reset the header compression protocol context for the DRBs configured with the header compression protocol;
1> discard the stored UE AS context and resumeIdentity;
1> if the RRCResume includes the masterCellGroup:
   2> perform the cell group configuration for the received masterCellGroup according to 5.3.5.5;
1> if the RRCResume includes the secondCellGroup:
   2> perform the cell group configuration for the received secondaryCellGroup according to 5.3.5.5;
1> if the RRCResume includes the radioBearerConfig is included:
   2> perform the radio bearer configuration according to 5.3.5.6;
Editor's Note: FFS Whether there needs to be a second radioBearerConfig.
1> resume SRB2 and all DRBs;
1> if stored, discard the cell reselection priority information provided by the idleModeMobilityControlInfo or inherited from another RAT;

1> if the RRCResume message includes the measConfig:
  2> perform the measurement configuration procedure as specified in 5.5.2;
1> resume measurements if suspended;
Editor's Note: FFS Whether there is a need to define UE actions related to access control timers (equivalent to T302, T303, T305, T306, T308 in LTE). For example, informing upper layers if a given timer is not running
1> enter RRC_CONNECTED;
1> indicate to upper layers that the suspended RRC connection has been resumed;
1> stop the cell re-selection procedure;
1> consider the current cell to be the PCell;
1> set the content of the of RRCResumeComplete message as follows:
  2> if the upper layer provide NAS PDU include and set the the dedicatedInfoNAS to include the information received from upper layers;
1> submit the RRCResumeComplete message to lower layers for transmission;
1> the procedure ends.
End proposed changes to the standard FIG. 7, in accordance with various embodiments, shows a communication system that includes a telecommunication network 710, such as a 3GPP-type cellular network, which comprises an access network 711, such as an gNB-RAN, and a core network 714 (e.g., 5GC). The access network 711 comprises a plurality of base stations 712a, 712b, 712c, such as gNBs or other types of wireless access points, each defining a corresponding coverage area 713a, 713b, 713c. Each base station 712a, 712b, 712c is connectable to the core network 714 over a wired or wireless connection 715. A first user equipment (UE) 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more sub-networks (not shown).

Figure 7:
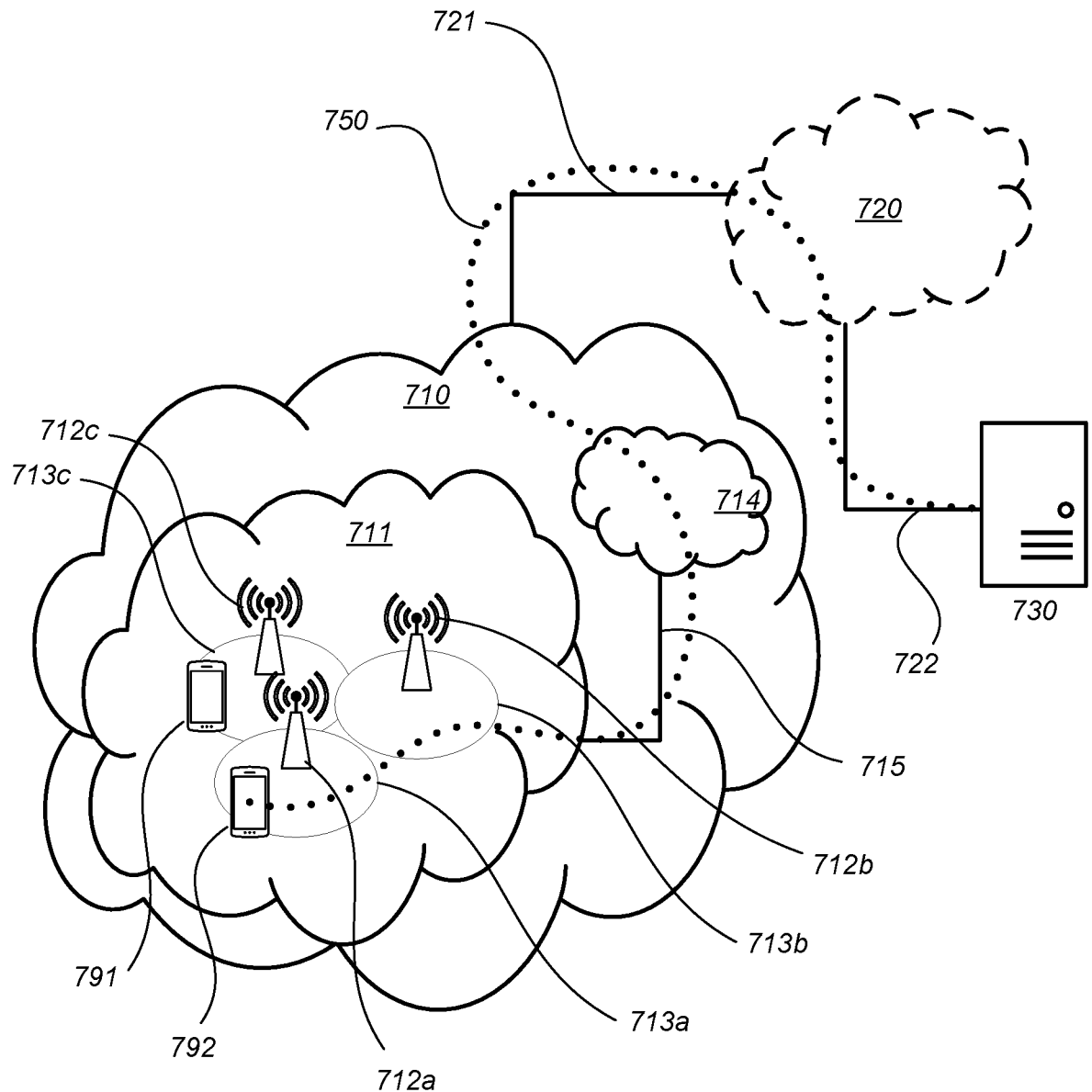
FIG. 7 illustrates an example communication system, according to some embodiments.

The communication system of FIG. 7 as a whole enables connectivity between one of the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 791. Similarly, the base station 712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
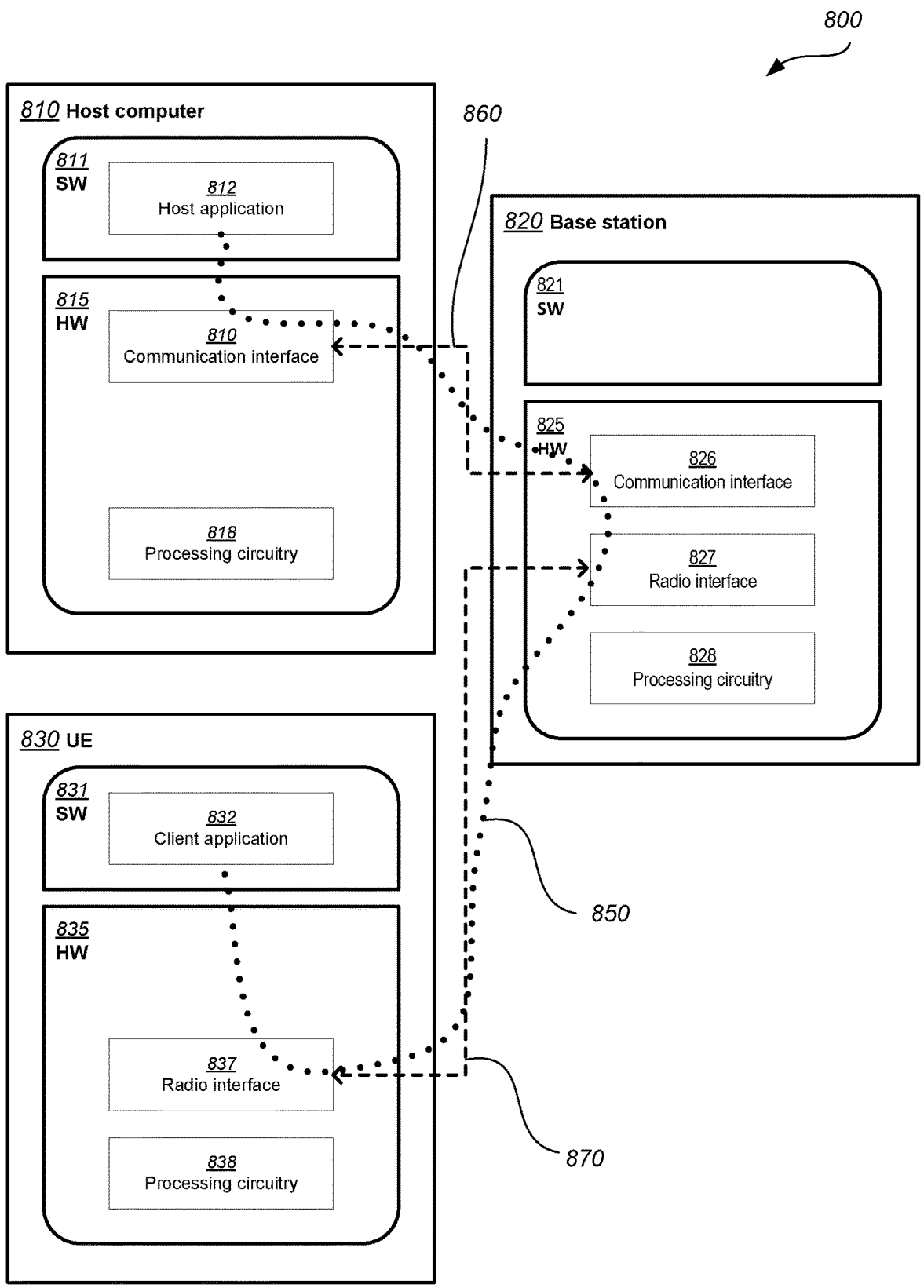
FIG. 8 is a generalized block diagram of a host computer communicating via a base station with a user equipment over a partially wireless connection, according to some embodiments.

It is noted that the host computer 810, base station 820 and UE 830 illustrated in FIG. 8 may be identical to the host computer 730, one of the base stations 712*a*, 712*b*, 712*c* and one of the UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further make decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. Storing measurement configurations at the UE makes it possible to reduce the size of the message resuming the UE (RRCResume message) to a minimum, as the network can apply a delta signaling as any ordinary handover. The UE may resume measurements using measurement configurations stored when the UE was inactive. These embodiments will result in improved performance, such as less latency and reduced delays for users of the RAN, including during idle/connection transitions.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or 'dummy' messages, using the OTT connection 850 while it monitors propagation times, errors etc.

Figure 9:
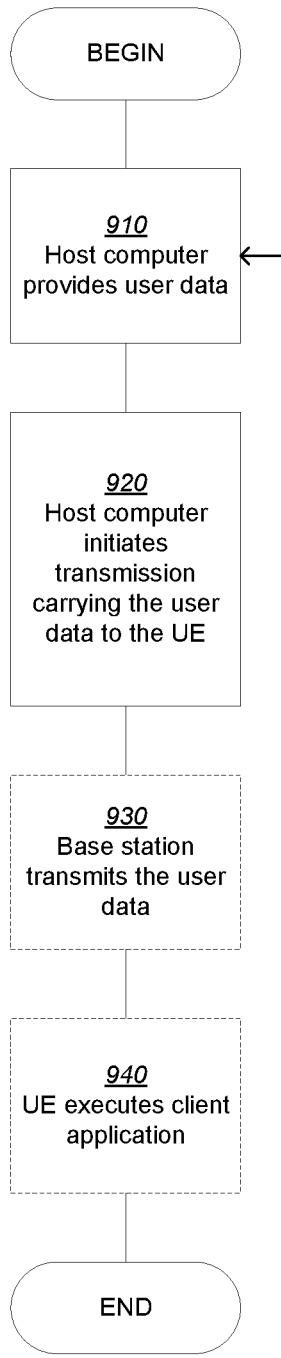
FIG. 9-12 are flowcharts illustrating methods implemented in a communication system including a host computer, a base station and a user equipment.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

Figure 10:
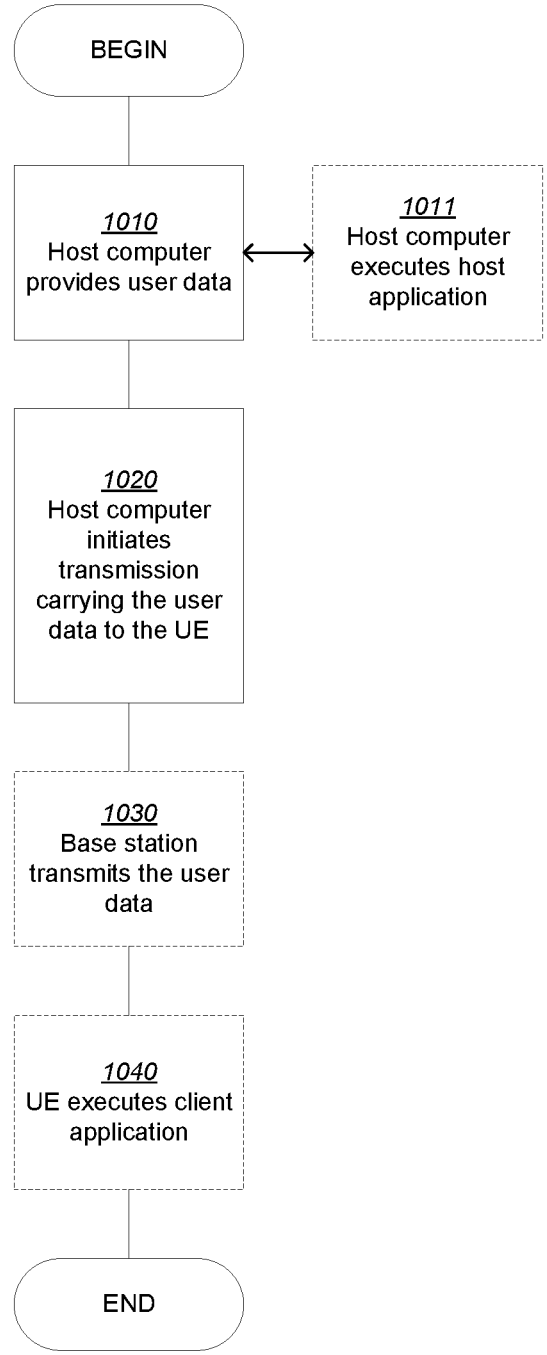

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 1010 of the method, the host computer provides user data. In an optional substep (not shown), the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

Figures 11, 12:
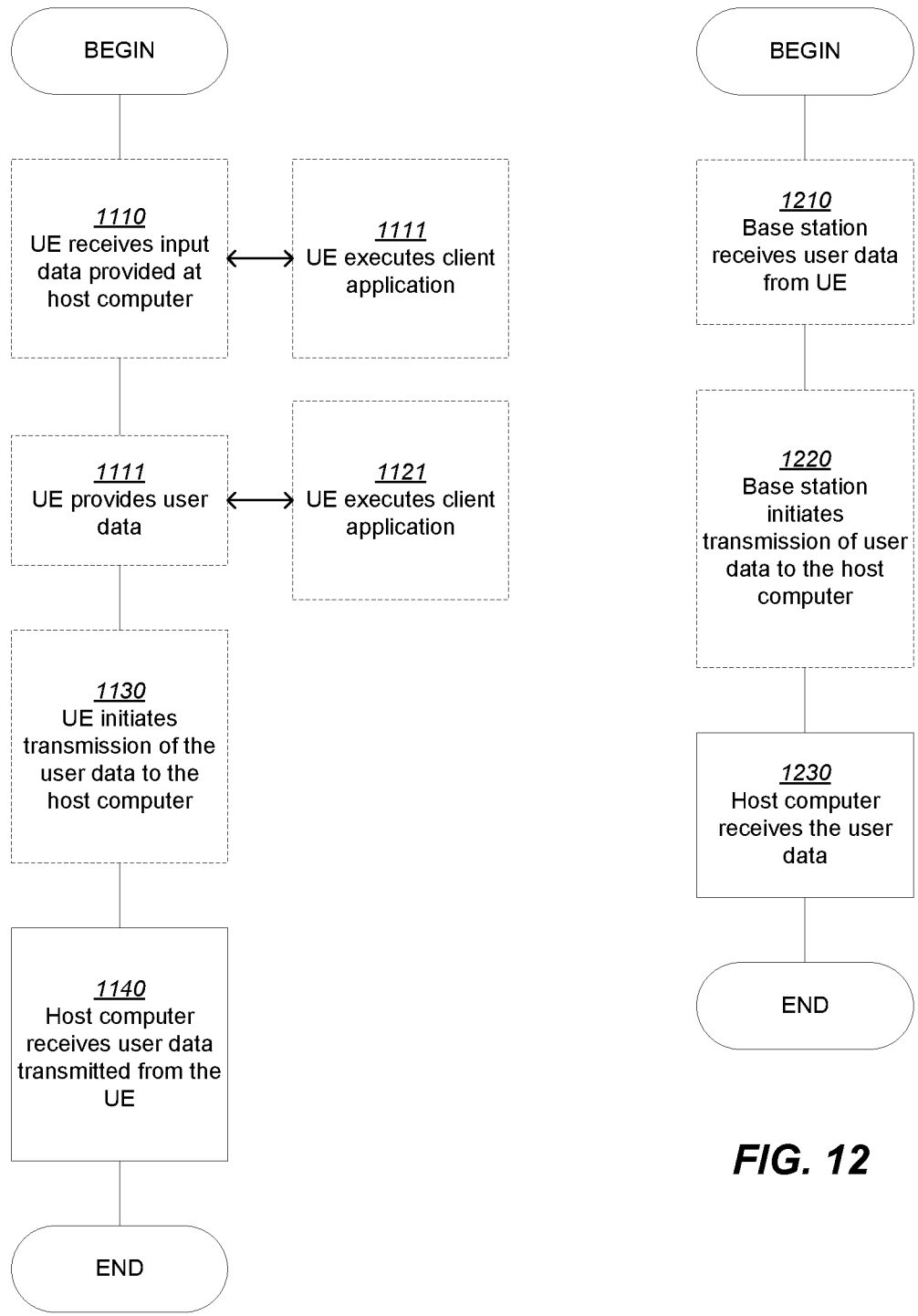

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 1110 of the method, the UE receives input data provided by the host computer. Additionally or alternatively, in an optional second step 1120, the UE provides user data. In an optional substep 1121 of the second step 1120, the UE provides the user data by executing a client application. In a further optional substep 1111 of the first step 2010, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1130, transmission of the user data to the host computer. In a fourth step 1140 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 1210 of the method, in accordance with the teachings of the embodiments described throughout this disclosure, the base station receives user data from the UE. In an optional second step 1220, the base station initiates transmission of the received user data to the host computer. In a third step 1230, the host computer receives the user data carried in the transmission initiated by the base station.

According to some embodiments, a method implemented in a communication system including a host computer, a base station and a UE includes, at the host computer, providing user data and initiating a transmission carrying the user data to the UE via a cellular network comprising the base station. The base station performs a method that includes configuring a UE to, upon transitioning from an RRC inactive state to an RRC connected state, resume one or more measurements according to one or more measurement configurations stored while the UE was in the RRC inactive state. The method may also include configuring a UE entering an RRC inactive state from a RRC connected state to perform one or more of the following: a set of actions related to the handling of measurement configurations responsive to or in conjunction with entering the RRC inactive state; a suspension of one or more previously configured measurements, responsive to or in conjunction with entering the RRC inactive state; and a set of actions related to the handling of measurement configurations while in the RRC inactive state. The user data may be provided at the host computer by executing a host application, and the method may further include, at the UE, executing a client application associated with the host application.

According to some embodiments, a method implemented in a communication system including a host computer, a base station, and a UE includes, at the host computer, receiving, from the base station, user data originating from a transmission which the base station has received from the UE. The base station performs a method that includes configuring a UE to, upon transitioning from an RRC inactive state to an RRC connected state, resume one or more measurements according to one or more measurement configurations stored while the UE was in the RRC inactive state. The method may also include configuring a UE entering an RRC inactive state from a RRC connected state to perform one or more of the following: a set of actions related to the handling of measurement configurations responsive to or in conjunction with entering the RRC inactive state; a suspension of one or more previously configured measurements, responsive to or in conjunction with entering the RRC inactive state; and a set of actions related to the handling of measurement configurations while in the RRC inactive state.

According to some embodiments, a communication system may include a host computer that includes processing circuitry configured to provide user data and a communication interface configured to forward the user data to a cellular network for transmission to a UE, where the cellular network comprises a base station having communication circuitry and processing circuitry. The base station's processing circuitry may configure a UE to, upon transitioning from an RRC inactive state to an RRC connected state, resume one or more measurements according to one or more measurement configurations stored while the UE was in the RRC inactive state. The processing circuitry may also be configured to configure a UE entering an RRC inactive state from a RRC connected state to perform one or more of the following: a set of actions related to the handling of measurement configurations responsive to or in conjunction with entering the RRC inactive state; a suspension of one or more previously configured measurements, responsive to or in conjunction with entering the RRC inactive state; and a set of actions related to the handling of measurement configurations while in the RRC inactive state.

The communication system may include the base station and/or the UE, where the UE is configured to communicate with the base station. The processing circuitry of the host computer may be configured to execute a host application, thereby providing the user data, and the UE may include processing circuitry configured to execute a client application associated with the host application.

According to some embodiments, a communication system including a host computer comprising a communication interface configured to receive user data originating from a transmission from a UE to a base station and comprising a radio interface and processing circuitry. The base station's processing circuitry is configured to configure a UE to, upon transitioning from an RRC inactive state to an RRC connected state, resume one or more measurements according to one or more measurement configurations stored while the UE was in the RRC inactive state. The processing circuitry may also be configured to configure a UE entering an RRC inactive state from a RRC connected state to perform one or more of the following: a set of actions related to the handling of measurement configurations responsive to or in conjunction with entering the RRC inactive state; a suspension of one or more previously configured measurements, responsive to or in conjunction with entering the RRC inactive state; and a set of actions related to the handling of measurement configurations while in the RRC inactive state. The communication system may include the base station and/or the UE, where the UE is configured to communicate with the base station. The host computer may include processing circuitry configured to execute a host application, and the UE may be configured to execute a client application associated with the host application, thereby providing the user data to be received by the host computer.

According to some embodiments, a method implemented in a communication system including a host computer, a base station and a UE includes, at the host computer, providing user data and initiating a transmission carrying the user data to the UE via a cellular network comprising the base station. The method at the UE includes entering an RRC inactive state from a RRC connected state, in response to a message received from the wireless network. The method may include subsequently transitioning from the RRC inactive state to the RRC connected state and resuming one or more measurements according to one or more measurement configurations stored while the UE was in the RRC inactive state. The method may also include performing one or more of the following steps: responsive to or in conjunction with entering the RRC inactive state, performing a set of actions related to handling of previously received measurement configurations; responsive to or in conjunction with entering the RRC inactive state, suspending one or more previously configured measurements; and while in the RRC inactive state, performing a set of actions related to the handling of previously received measurement configurations. The method at the UE may include receiving the user data from the base station.

According to some embodiments, a communication system including a host computer includes a communication interface configured to receive user data originating from a transmission from a UE to a base station. The UE's processing circuitry is configured to enter an RRC inactive state from an RRC connected state, in response to a message received from the wireless network. The processing circuitry is also configured to subsequently transition from the RRC inactive state to the RRC connected state and resume one or more measurements according to one or more measurement configurations stored while the UE was in the RRC inactive state. The processing circuitry may also be configured to perform one or more of the following steps: responsive to or in conjunction with entering the RRC inactive state, performing a set of actions related to handling of previously received measurement configurations; responsive to or in conjunction with entering the RRC inactive state, suspending one or more previously configured measurements; and while in the RRC inactive state, performing a set of actions related to the handling of previously received measurement configurations. The communication system may include the UE and/or the base station, where the base station includes a radio interface configured to communicate with the UE and a communication interface configured to forward to the host computer the user data carried by a transmission from the UE to the base station. The processing circuitry of the host computer may be configured to execute a host application, and the UE's processing circuitry may be configured to execute a client application associated with the host application, thereby providing the user data. The processing circuitry of the host computer may be configured to execute a host application, thereby providing request data, and the UE's processing circuitry may be configured to execute a client application associated with the host application, thereby providing the user data in response to the request data.

According to some embodiments, a method implemented in a UE includes entering an RRC inactive state from a RRC connected state, in response to a message received from the wireless network. The method may include subsequently transitioning from the RRC inactive state to the RRC connected state and resuming one or more measurements according to one or more measurement configurations stored while the UE was in the RRC inactive state. The method may include performing one or more of the following steps: responsive to or in conjunction with entering the RRC inactive state, performing a set of actions related to handling of previously received measurement configurations; responsive to or in conjunction with entering the RRC inactive state, suspending one or more previously configured measurements; and while in the RRC inactive state, performing a set of actions related to the handling of previously received measurement configurations. The method may include providing user data and forwarding the user data to a host computer via the transmission to the base station.

According to some embodiments, a method implemented in a communication system including a host computer, a base station and a UE includes, at the host computer, receiving user data transmitted to the base station from the UE. The method at the UE includes entering an RRC inactive state from a RRC connected state, in response to a message received from the wireless network. The method may include subsequently transitioning from the RRC inactive state to the RRC connected state and resuming one or more measurements according to one or more measurement configurations stored while the UE was in the RRC inactive state. The method may also include performing one or more of the following steps: responsive to or in conjunction with entering the RRC inactive state, performing a set of actions related to handling of previously received measurement configurations; responsive to or in conjunction with entering the RRC inactive state, suspending one or more previously configured measurements; and while in the RRC inactive state, performing a set of actions related to the handling of previously received measurement configurations. The method at the UE may also include performing one or more of the following steps: responsive to or in conjunction with entering the RRC inactive state, performing a set of actions related to handling of previously received measurement configurations; responsive to or in conjunction with entering the RRC inactive state, suspending one or more previously configured measurements; and while in the RRC inactive state, performing a set of actions related to the handling of previously received measurement configurations. The method at the UE may include providing the user data to the base station and/or executing a client application, thereby providing the user data to be transmitted. The method at the host computer may include executing a host application associated with the client application. The method at the UE may include executing a client application and receiving input data to the client application, the input data being provided at the host computer by executing a host application associated with the client application, where the user data to be transmitted is provided by the client application in response to the input data.

According to some embodiments, a communication system including a host computer comprises a communication interface configured to receive user data originating from a transmission from a UE to a base station. The UE's processing circuitry is configured to enter an RRC inactive state from an RRC connected state, in response to a message received from the wireless network. The processing circuitry is also configured to subsequently transition from the RRC inactive state to the RRC connected state and resume one or more measurements according to one or more measurement configurations stored while the UE was in the RRC inactive state. The processing circuitry may be configured to perform one or more of the following steps: responsive to or in conjunction with entering the RRC inactive state, performing a set of actions related to handling of previously received measurement configurations; responsive to or in conjunction with entering the RRC inactive state, suspending one or more previously configured measurements; and while in the RRC inactive state, performing a set of actions related to the handling of previously received measurement configurations. The communication system may include the UE. The communication system may include the base station, where the base station comprises a radio interface configured to communicate with the UE and a communication interface configured to forward to the host computer the user data carried by a transmission from the UE to the base station. The processing circuitry of the host computer may be configured to execute a host application and the UE's processing circuitry may be configured to execute a client application associated with the host application, thereby providing the user data. The processing circuitry of the host computer may be configured to execute a host application, thereby providing request data, and the UE's processing circuitry may be configured to execute a client application associated with the host application, thereby providing the user data in response to the request data.

As discussed in detail above, the techniques described herein, e.g., as illustrated in the process flow diagrams of FIGS. 3 and 5, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 13:
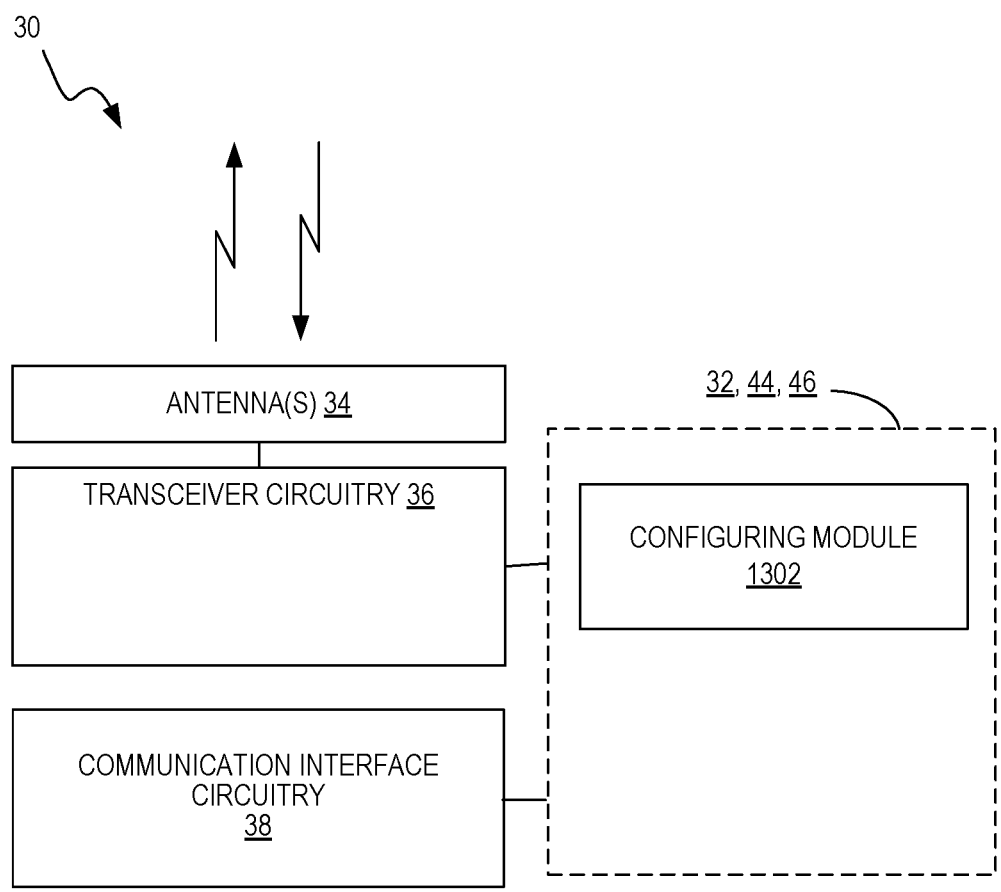
FIG. 13 is a block diagram illustrating a functional representation of an example of one or more network nodes.

FIG. 13 illustrates an example functional module or circuit architecture as may be implemented in one or more network nodes 30. The implementation includes a configuring module 1302 for configuring a wireless device 50 to, upon transitioning from an RRC inactive state to an RRC connected state, resume one or more measurements according to one or more measurement configurations stored while the wireless device 50 was in the RRC inactive state. The configuring module may also be for configuring the wireless device 50 entering an RRC inactive state from a RRC connected state to perform one or more of the following: a set of actions related to the handling of measurement configurations responsive to or in conjunction with entering the RRC inactive state; a suspension of one or more previously configured measurements, responsive to or in conjunction with entering the RRC inactive state; and a set of actions related to the handling of measurement configurations while in the RRC inactive state.

Figure 14:
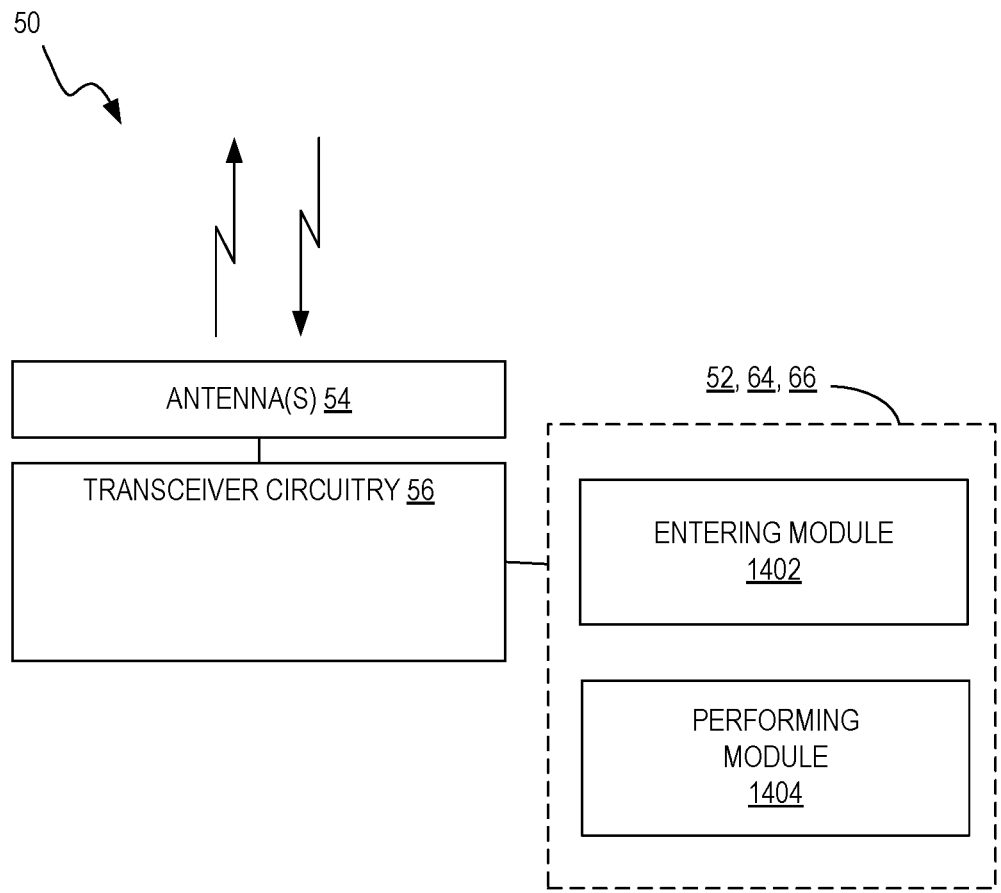
FIG. 14 is a block diagram illustrating a functional representation of an example wireless device.

FIG. 14 illustrates an example functional module or circuit architecture as may be implemented in a wireless device 50. The implementation includes an entering module 1402 for entering an RRC inactive state from a RRC connected state, in response to a message received from the wireless network. The implementation also includes a performing module 1404 for, upon subsequently transitioning from the RRC inactive state to the RRC connected state, resuming one or more measurements according to one or more measurement configurations stored while the wireless device 50 was in the RRC inactive state. The performing module 1404 may also be for performing one or more of the following steps: responsive to or in conjunction with entering the RRC inactive state, performing a set of actions related to handling of previously received measurement configurations; responsive to or in conjunction with entering the RRC inactive state, suspending one or more previously configured measurements; and while in the RRC inactive state, performing a set of actions related to the handling of previously received measurement configurations.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, in a wireless device operating in a wireless network, for handling measurement configurations, the method comprising:
    entering a Radio Resource Control (RRC) inactive state from an RRC connected state, in response to a message received from the wireless network;
    responsive to or in conjunction with entering the RRC inactive state, performing a set of actions related to handling of previously received measurement configurations, wherein performing the set of actions related to the handling of previously received measurement configurations responsive to or in conjunction with entering the RRC inactive state comprises storing all or a subset of measurement configurations existing as of entering the RRC inactive state and wherein said storing is performed selectively, in response to receiving an indication that the measurement configurations or a subset of the measurement configurations should not be released;
    subsequently transitioning from the RRC inactive state to the RRC connected state; and
    resuming, upon returning to the RRC connected state, one or more measurements according to one or more measurement configurations stored while the wireless device was in the RRC inactive state, wherein said resuming according to the measurement configurations stored while the wireless device was in the RRC inactive state comprises adjusting one or more of the measurement configurations stored while the wireless device was in the RRC inactive state with measurement configuration information included in an RRCResume message received while in the RRC inactive state.

2. A wireless device comprising:
    transceiver circuitry; and
    processing circuitry operatively associated with the transceiver circuitry and configured to:
        enter a Radio Resource Control (RRC) inactive state from an RRC connected state, in response to a message received from the wireless network;
        responsive to or in conjunction with entering the RRC inactive state, perform a set of actions related to handling of previously received measurement configurations, wherein performing the set of actions related to the handling of previously received measurement configurations responsive to or in conjunction with entering the RRC inactive state comprises storing all or a subset of measurement configurations existing as of entering the RRC inactive state and wherein said storing is performed selectively, in response to receiving an indication that the measurement configurations or a subset of the measurement configurations should not be released;
        subsequently transition from the RRC inactive state to the RRC connected state; and
        resume, upon returning to the RRC connected state, one or more measurements according to one or more measurement configurations stored while the wireless device was in the RRC inactive state, wherein said resuming one or more measurement configurations stored while the wireless device was in the RRC inactive state comprises adjusting one or more of the measurement configurations stored while the wireless device was in the RRC inactive state with measurement configuration information included in an RRCResume message received while in the RRC inactive state.

3. A method, in a wireless device operating in a wireless network, for handling measurement configurations, the method comprising:

entering a Radio Resource Control (RRC) inactive state from an RRC connected state, in response to a message received from the wireless network;

subsequently transitioning from the RRC inactive state to the RRC connected state; and resuming one or more measurements according to one or more measurement configurations stored while the wireless device was in the RRC inactive state, wherein said resuming is performed selectively, in response to receiving an RRCResume message that does not include a new measurement configuration.

4. The method of claim 3, wherein the method further comprises performing one or more of the following steps:

responsive to or in conjunction with entering the RRC inactive state, performing a set of actions related to handling of previously received measurement configurations;

responsive to or in conjunction with entering the RRC inactive state, suspending one or more previously configured measurements; and while in the RRC inactive state, performing a set of actions related to the handling of previously received measurement configurations.

5. The method of claim 4, wherein performing the set of actions related to the handling of previously received measurement configurations responsive to or in conjunction with entering the RRC inactive state comprises storing all or a subset of measurement configurations existing as of entering the RRC inactive state.

6. The method of claim 5, wherein said storing is performed selectively, in response to receiving an indication that the measurement configurations or a subset of the measurement configurations should not be released.

7. The method of claim 6, wherein said storing comprises storing all existing measurement configurations except for one or more fields explicitly indicated to the wireless device.

8. The method of claim 4, wherein performing the set of actions related to the handling of previously received measurement configurations responsive to or in conjunction with entering the RRC inactive state comprises releasing a subset of measurement configurations existing as of entering the RRC inactive state.

9. The method of claim 8, wherein said releasing is performed selectively, in response to receiving an indication that a subset of the measurement configurations should be released.

10. The method of claim 4, wherein said suspending is performed selectively, in response to receiving an indication that measurements should be suspended.

11. The method of claim 4, wherein said suspending comprises suspending all existing measurements except for one or more measurements explicitly indicated to the wireless device.

12. The method of claim 3, wherein the method further comprises releasing one or more parts of stored measurement configurations in response to one or more of a predefined set of triggering events.

13. The method of claim 12, wherein the predefined set of triggering events includes any one or more of the following:

a cell reselection;

a cell reselection within New Radio (NR) and with Long Term Evolution (LTE) cells connected to 5G core (5GC);

intra-radio access technology (RAT) cell reselection;

inter-frequency cell reselection;

expiration of a timer, configured by RRC, such as in an RRCSuspend message;

entering a new radio access network (RAN) area;

performing of periodic RAN Area updates;

attempting to resume, by sending an RRCResumeRequest, and receiving an RRCConnectionSetup; and a change in cell coverage, by detecting that a set of downlink beams covering the wireless device have changed.

14. A method, in one or more nodes in or connected to a wireless network, for providing for handling of measurement configurations, the method comprising:

configuring a wireless device to, upon transitioning from a Radio Resource Control (RRC) inactive state to an RRC connected state, resume one or more measurements according to one or more measurement configurations stored while the wireless device was in the RRC inactive state, wherein the method comprises configuring the wireless device to, upon entering the RRC inactive state, perform:

a set of actions related to the handling of measurement configurations responsive to or in conjunction with entering the RRC inactive state, wherein the set of actions comprises resuming one or more measurements according to one or more measurement configurations stored while the wireless device was in the RRC inactive state, wherein said resuming is performed selectively, in response to receiving an RRCResume message that does not include a new measurement configuration.

15. One or more network nodes comprising:

communication circuitry; and processing circuitry operatively associated with the communication circuitry and configured to:

configure a wireless device to, upon transitioning from a Radio Resource Control (RRC) inactive state to an RRC connected state, resume one or more measurements according to one or more measurement configurations stored while the wireless device was in the RRC inactive state, wherein the processing circuitry is configured to configure the wireless device to, upon entering the RRC inactive state, perform:

a set of actions related to the handling of measurement configurations responsive to or in conjunction with entering the RRC inactive state, where the set of actions comprises resuming one or more measurements according to one or more measurement configurations stored while the wireless device was in the RRC inactive state, wherein said resuming is performed selectively, in response to receiving an RRCResume message that does not include a new measurement configuration.

16. A method, in a wireless device operating in a wireless network, for handling measurement configurations, the method comprising:

entering a Radio Resource Control (RRC) inactive state from an RRC connected state, in response to a message received from the wireless network;

subsequently transitioning from the RRC inactive state to the RRC connected state; and resuming one or more measurements, upon transitioning to the RRC connected state, according to one or more measurement configurations stored while the wireless device was in the RRC inactive state, wherein said resuming is performed according to one or more measurement configurations stored while the wireless device was in the RRC inactive state, despite receiving an RRCResume message that includes a new measurement configuration.

* * * * *

UNITED STATES PATENT AND TRADEMARK OFFICE
CERTIFICATE OF CORRECTION

PATENT NO. : 11,284,468 B2
APPLICATION NO. : 16/461294
DATED : March 22, 2022
INVENTOR(S) : Mildh et al.

It is certified that error appears in the above-identified patent and that said Letters Patent is hereby corrected as shown below:

On the Title Page

On Page 2, item (56), under "OTHER PUBLICATIONS", in Column 2, Line 6, delete "Greece , Feb. 26 Mar. 2, 2018," and insert -- Greece, Feb. 26-Mar. 2, 2018, --, therefor.

On Page 2, item (56), under "OTHER PUBLICATIONS", in Column 2, Line 23, delete "Author ," and insert -- Author, --, therefor.

On Page 2, item (56), under "OTHER PUBLICATIONS", in Column 2, Line 23, delete "Idle/lnactive" and insert -- Idle/Inactive --, therefor.

On Page 2, item (56), under "OTHER PUBLICATIONS", in Column 2, Line 24, delete "Wg2" and insert -- WG2 --, therefor.

On Page 2, item (56), under "OTHER PUBLICATIONS", in Column 2, Line 26, delete "Author ," and insert -- Author, --, therefor.

On Page 2, item (56), under "OTHER PUBLICATIONS", in Column 2, Line 29, delete "Author ," and insert -- Author, --, therefor.

In the Drawings

In Fig 8, Sheet 8 of 12, delete "..." and insert

*810 Communication interface*

Signed and Sealed this
Twenty-fifth Day of June, 2024

Katherine Kelly Vidal
*Director of the United States Patent and Trademark Office*

CERTIFICATE OF CORRECTION (continued)

In Fig 11, Sheet 10 of 12, delete "  " and insert -- -- , therefor.

In the Specification

In Column 1, Lines 37-38, delete "Access and Mobility Function (AMF)." and insert -- Access and Mobility Management Function (AMF). --, therefor.

In Column 4, Line 53, delete "suspend," and insert -- suspend message, --, therefor.

In Column 4, Line 61, delete "FIG. 9-12" and insert -- FIGS. 9-12 --, therefor.

In Column 5, Line 17, delete "terms" and insert -- term --, therefor.

In Column 5, Line 59, delete "perform" and insert -- performing --, therefor.

In Column 10, Line 57, delete "a predefined" and insert -- predefined --, therefor.

In Column 13, Line 2, delete "transition" and insert -- transitioned --, therefor.

In Column 15, Line 52, delete "Begin" and insert -- --Begin --, therefor.

In Column 16, Line 33, below "[ffsReference]" insert -- . . . --, therefor.

In Column 17, Line 8, delete "running" and insert -- running. --, therefor.

In Column 17, Line 17, delete "the the" and insert -- the --, therefor.

In Column 17, Line 22, delete "End" and insert -- --End --, therefor.

In Column 17, Line 22, delete "standard" and insert -- standard. --, therefor.

In Column 19, Line 28, delete "use equipment 830" and insert -- user equipment 830 --, therefor.

In Column 19, Line 31, delete "which it" and insert -- which --, therefor.

CERTIFICATE OF CORRECTION (continued)
U.S. Pat. No. 11,284,468 B2

In Column 20, Line 5, delete "etc.; the" and insert -- etc. The --, therefor.

In the Claims

In Column 26, Line 40, in Claim 2, delete "the wireless network;" and insert -- a wireless network; --, therefor.

In Column 27, Line 27, in Claim 4, delete "a set" and insert -- the set --, therefor.

In Column 28, Line 7, in Claim 13, delete "intra-radio access technology (RAT)" and insert -- intra-radio access technology (IRAT) --, therefor.